United States Patent
Lockwood

(10) Patent No.: US 7,213,839 B2
(45) Date of Patent: May 8, 2007

(54) AIR-BAG

(75) Inventor: Andrew P. Lockwood, Daventry (GB)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/024,273

(22) Filed: Dec. 27, 2004

(65) Prior Publication Data

US 2006/0138755 A1 Jun. 29, 2006

(51) Int. Cl.
*B60R 21/16* (2006.01)

(52) U.S. Cl. .................................... 280/743.2

(58) Field of Classification Search ............ 280/730.2, 280/743.2, 749
See application file for complete search history.

(56) References Cited

U.S. PATENT DOCUMENTS

| | | | | |
|---|---|---|---|---|
| 5,667,241 A * | 9/1997 | Bunker et al. | ............ | 280/730.2 |
| 6,135,490 A * | 10/2000 | Spary | ....................... | 280/730.2 |
| 6,168,186 B1 * | 1/2001 | Welch et al. | ............. | 280/730.2 |
| 6,293,581 B1 * | 9/2001 | Saita et al. | ............... | 280/730.2 |
| 6,315,323 B1 * | 11/2001 | Pack, Jr. | .................... | 280/743.2 |
| 6,334,627 B1 * | 1/2002 | Heym et al. | ............. | 280/743.2 |
| 6,502,858 B2 * | 1/2003 | Amamori | .................. | 280/743.2 |
| 6,648,371 B2 * | 11/2003 | Vendely et al. | ............. | 280/739 |
| 6,783,148 B2 * | 8/2004 | Henderson | ............... | 280/728.2 |
| 6,866,292 B2 * | 3/2005 | Thomas | ..................... | 280/730.2 |
| 6,966,579 B2 * | 11/2005 | Schneider et al. | ........ | 280/743.2 |
| 2002/0067029 A1 * | 6/2002 | Guthke et al. | ........... | 280/730.2 |
| 2003/0020268 A1 * | 1/2003 | Reiter et al. | ................ | 280/742 |
| 2003/0132615 A1 * | 7/2003 | Henderson | ............... | 280/728.3 |
| 2004/0188987 A1 * | 9/2004 | Salmo et al. | ............... | 280/729 |
| 2005/0087960 A1 * | 4/2005 | Gammill | ................... | 280/728.2 |
| 2005/0134025 A1 * | 6/2005 | Ridella et al. | ........... | 280/730.2 |
| 2006/0012154 A1 * | 1/2006 | Roberts et al. | .......... | 280/730.2 |
| 2006/0043704 A1 * | 3/2006 | Coon et al. | ............... | 280/730.2 |
| 2006/0061074 A1 * | 3/2006 | Aoki et al. | ............... | 280/730.2 |
| 2006/0061075 A1 * | 3/2006 | Aoki et al. | ............... | 280/730.2 |

* cited by examiner

*Primary Examiner*—Eric Culbreth
*Assistant Examiner*—Barry Gooden, Jr.
(74) *Attorney, Agent, or Firm*—Brinks Hofer Gilson & Lione

(57) ABSTRACT

An air-bag is disclosed which takes the form of an inflatable curtain, having a gas inlet neck to receive gas from a gas generator. The air-bag has a tether which extends from the exterior of the air-bag at a point adjacent to the gas inlet neck. Part of the tether is at least initially secured to a mount by a mounting arrangement, and the tether is yieldable such that, on deployment of the air-bag, the point from which the tether extends from the air-bag may move away from the mount so that the tether yields with the absorption of energy.

22 Claims, 2 Drawing Sheets

AIR-BAG

BACKGROUND OF THE INVENTION

The present invention relates to an air-bag and more particularly relates to an air-bag in the form of an inflatable curtain for use in a motor vehicle.

It has been proposed to provide motor vehicles with many different types of air-bag, in order to provide protection for the occupants of the vehicle in case various types of accident should occur.

To provide protection for an occupant of a vehicle in the case of a side impact or roll-over situation, it has been proposed to provide an air-bag which is in the form of an inflatable curtain. An air-bag of this type, when inflated, extends from the roof-line of the vehicle above the side doors or the side windows of the vehicle, downwardly to form a "curtain" extending across the window opening in the door or the windows on the side of the vehicle. The air-bag is provided to reduce the risk that the head or a limb of an occupant of the vehicle will be ejected through the windows of the vehicle during a side impact or roll-over situation.

In a side impact situation, it is necessary for an air-bag of this type to be inflated extremely swiftly, with inflation preferably being completed in less than 20 milliseconds. If it takes longer than this to inflate the air-bag, another vehicle or object impacting the side of the vehicle, may penetrate deeply into the cabin of the vehicle leading to an increased likelihood of injury of an occupant of the vehicle.

Because the air-bag of this type has to be inflated in a very short period of time following detection of a side impact, gas must flow, from the associated gas generator, into the air-bag at a very high rate. The inlet area of an inflatable curtain is therefore subjected to very high forces from the aggressive flow of gas during inflation of the inflatable curtain, especially during the initial stages of inflation.

It has been found that on some occasions the air-bag may rupture in the area of the gas inlet during inflation. The present invention seeks to provide an improved air-bag which reduces the likelihood of such ruptures.

BRIEF SUMMARY OF THE INVENTION

According to the present invention, there is provided an air-bag in the form of an inflatable curtain, having a gas inlet neck to receive gas from a gas generator. The air-bag further having a tether extending from the exterior of the air-bag at a point adjacent the gas inlet neck, with part of the tether being at least initially secured to a mount by a mounting arrangement. The tether being yieldable such that, on deployment of the air-bag, the tether attachment point may move away from the mount so that the tether yields with the absorption of energy.

Preferably, the mounting arrangement is a mounting ring surrounding the air-bag neck and clamping the neck to part of a gas generator, the tether passing though the mounting ring so as to be clamped in position.

Advantageously, the tether is configured to be withdrawn from the clamping ring, with the absorption of energy, on the deployment of the air-bag. The tether may further be provided with an area of mechanical weakness, for example by a notch or slit cut in the tether.

Advantageously, the tether of the air-bag of this invention is provided with a terminal aperture for a connector to connect the end of the tether to the mount. Conveniently, the mount is a mount mounting a gas generator and the connector is a yieldable connector. Advantageously, the tether is formed integrally with the air-bag or may be stitched, glued or otherwise secured to the air-bag. The stitching, gluing or other securing of the tether to the air-bag is yieldable and yields, with the absorption of energy, on deployment of the air-bag.

The neck of the air-bag may be provided at one end of the air-bag. Alternatively, the neck is provided on the upper edge of the air-bag intermediate the ends of the upper edge of the air-bag.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
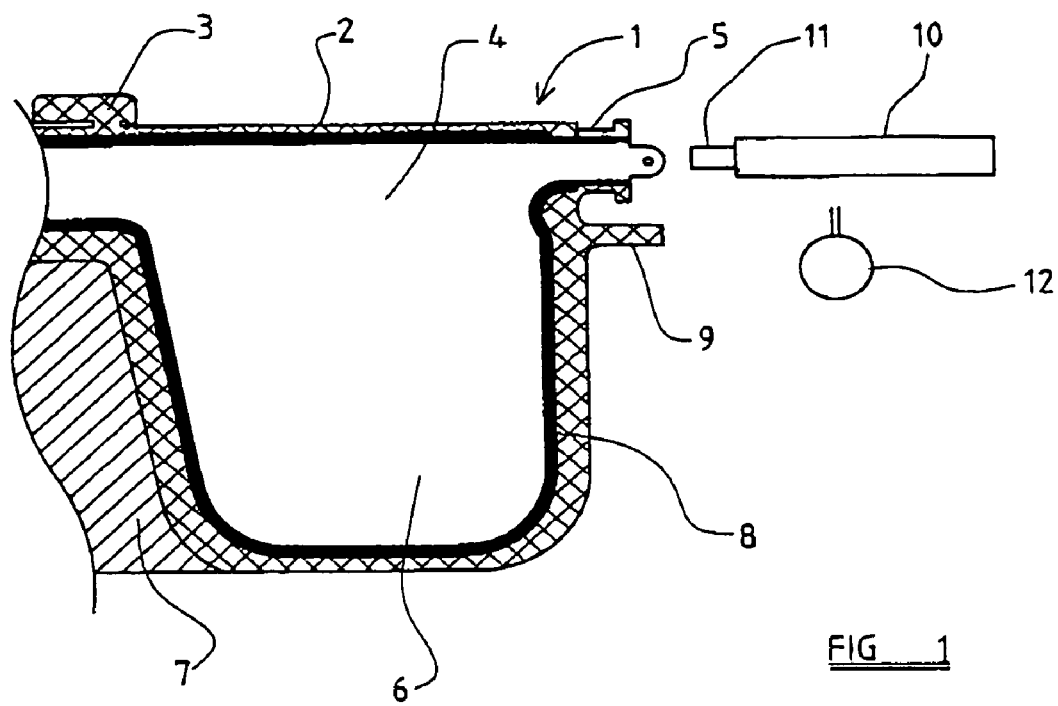
FIG. 1 is a diagrammatic view illustrating part of an air-bag in accordance with the invention, a gas generator and a connecting clip.

Referring initially to FIG. 1 of the accompanying drawings, part of an air-bag 1 in the form of an inflatable curtain is illustrated. A typical air-bag in the form of an inflatable curtain has an upper edge 2 which is to be connected, by means of mounting tabs 3, to the roof of a vehicle at a position above the door opening and/or above the side windows of the vehicle.

Adjacent the upper edge 2 of the air-bag is a horizontally extending gas flow duct 4. The gas flow duct 4 is provided with a connecting neck 5 to be connected to a gas generator 10. In this embodiment of the invention, the neck 5 is provided at one side end of the air-bag 1. However, in variants of the invention, it is envisaged that the neck 5 could be provided more centrally, for example in the region of the B-post of a motor vehicle, and communicate with inflatable regions of the air-bag both in front and behind the B-post.

Beneath the gas flow duct 4 within the air-bag 1 are a plurality of inflatable chambers which communicate with the gas flow duct 4. In FIG. 1 only one such inflatable chamber 6 is illustrated. Between the inflatable chambers 6 are uninflatable regions, such as the uninflatable region 7.

The inflatable curtain 1 may be made from two superimposed layers of fabric which are stitched together, but in the preferred embodiment, as illustrated, the air-bag is formed using a one-piece weaving process. In specific areas of the air-bag, such as the peripheral region 8, the warp and weft yearns of the fabric are interwoven to form a single fabric layer. However, in the regions such as the regions where the gas flow duct 4 and the chamber 6 are provided, the warp and weft yarns of the fabric are separated to form two discrete adjacent layers of fabric.

At a position adjacent the neck 5, the air-bag 1 is provided with a protruding tether 9. The tether 9 may form part of the peripheral region 8 of the air-bag 1 where the wrap and weft yarns are woven together to form a single layer of fabric. However, in alternative embodiments, the tether 9 may be stitched, glued or otherwise secured to the main part of the air-bag 1.

A cylindrical gas generator 10 is provided, having an end region 11 configured to be inserted into the neck 5 which communicates with the gas flow duct 4. A connecting clamping ring 12 is provided which can surround the neck 5, when the gas generator has been mounted in position, and which can be drawn tight to connect the neck 5 securely to the gas generator 10.

When the ring 12 is located in position to surround the neck 5, the tether 9 is located to pass through the ring 12, so that the tether 9 is clamped against the neck 5 by the action of the ring 12.

Figure 2:
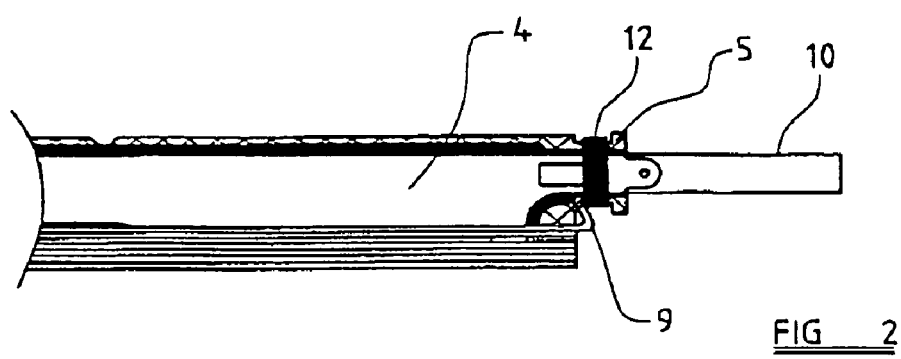
FIG. 2 is a view showing the air-bag, gas generator and connecting clip of FIG. 1, when the gas generator has been connected to the air-bag and when the air-bag is in an initial folded condition, prior to inflation.

Turning now to FIG. 2, the gas generator 10 is shown inserted in position within the neck 5, and the clamping ring 12 surrounds the neck 5, thus securely clamping the neck 5 to part of the gas generator 10. The tether 9 is shown in position passing through the ring 12, so that the ring 12 effectively clamps the tether 9 in position adjacent the neck 5.

The lower-most part of the air-bag 1, i.e. the part defining the chamber 6 and the uninflatable region 7, has been folded for packaging within the head lining of a motor vehicle using, for example, a concertina-type fold. The gas flow duct 4 is shown as being generally unobstructed.

Figure 3:
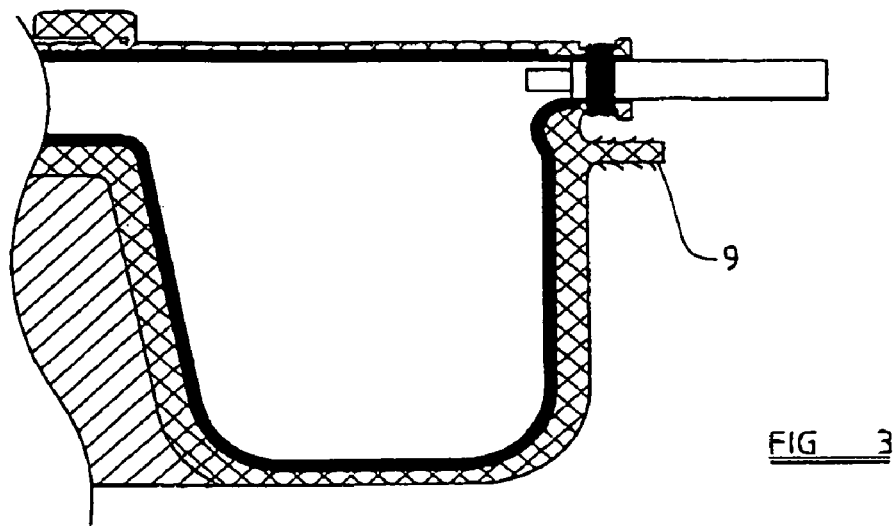
FIG. 3 is a view corresponding to FIGS. 1 and 2 showing the air-bag of FIG. 2 after inflation of the air-bag.

On deployment of the air-bag, gas from the gas generator 10 will flow directly into the gas flow duct 4. This will tend to cause the lower part of the air-bag to inflate and move generally downwardly, from the position shown in FIG. 2 to the position as shown in FIGS. 1 and 3. As the inflatable part of the air-bag moves downwardly, the tether 9 will be drawn through the ring 12, with the absorption of energy. The edges of the tether 9 may become frayed during this withdrawing step. The absorption of energy in this way reduces the risk that the part of the air-bag 1 adjacent the neck 5 will become damaged during inflation of the air-bag.

Figure 4:
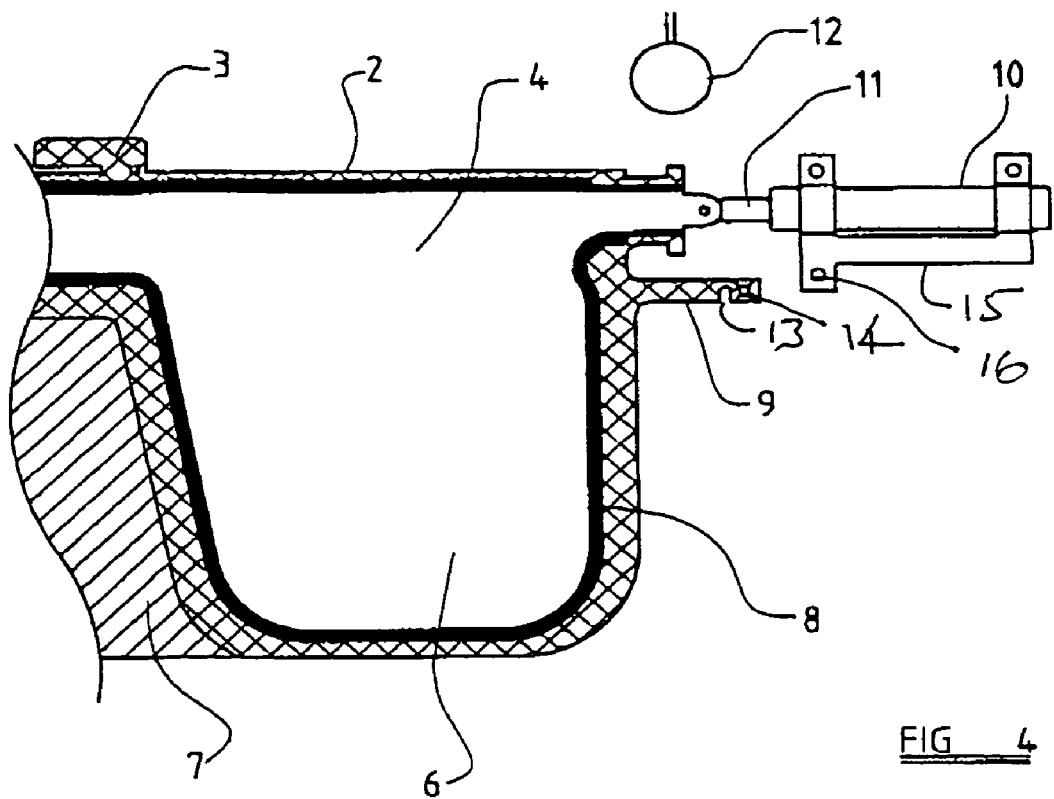
FIG. 4 is a view illustrating an air-bag, a gas generator and a connecting clip forming a modified embodiment of the invention.

FIG. 4 illustrates a modified embodiment of the invention. In the embodiment of the invention shown in FIG. 4, the tether 9 is provided with a region of relative mechanical weakness 13 formed by a "V"-shaped notch or cut provided in the tether. The free end of the tether 9 is provided with an aperture 14. The gas generator is provided with a mounting bracket 15.

It is envisaged that the tether 9 may be connected to the mounting bracket 15 by means of a mounting bolt passing through the aperture 14 at the free end of the tether and passing through one of the mounting holes 16 provided for the mounting bracket 15. Mounting bracket 15 provides a fixed point of attachment to the associated motor vehicle.

It is to be appreciated that on deployment of an air-bag of the type shown in FIG. 4, the tether 9 will rupture at the point of mechanical weakness 13, thus absorbing energy.

It is to be appreciated that in modified embodiments of the invention the tether 9 may be stitched or glued to the main part of the air-bag 1 in such a way that the stitching or gluing will yield when the air-bag is inflated, thus absorbing energy. Also the free end of the tether 9 could be connected to the mounting bracket 15 using a yieldable connector.

It is to be understood that in each embodiment the tether 9 is a tether which acts initially to secure part of the air-bag 1 to a fixed point, the tether being a yieldable tether which will yield, with the absorption of energy, on deployment of the air-bag.

Figure 5:
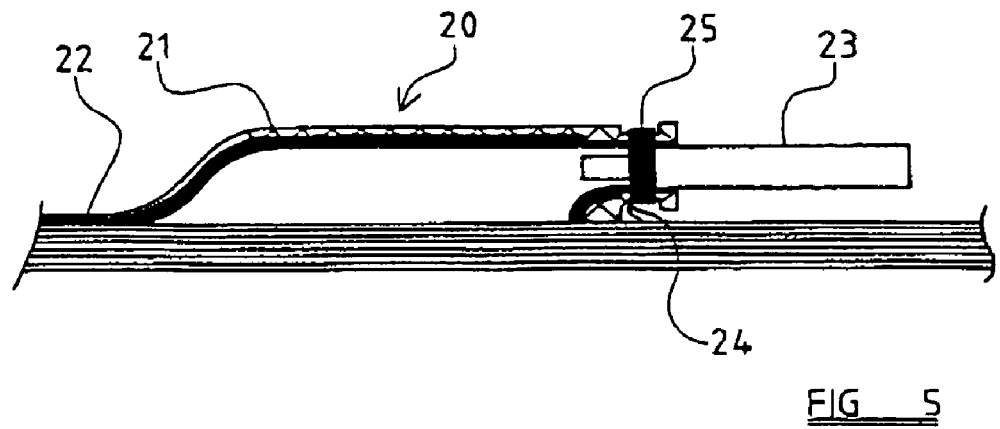
FIG. 5 is a view, corresponding generally to FIG. 2, but illustrating a modified embodiment of the invention.

Whilst FIGS. 1 to 4 show a tether 9 associated with a neck 5 provided at one end of an inflatable curtain, it is now quite common, as alluded to above, for an inflatable curtain to have a neck provided at a substantially central position, to receive a gas generator. FIG. 5 illustrates an inflatable curtain air-bag 20 of this type. The inflatable curtain air-bag 20 is provided with a neck 21 at a point intermediate the ends of the upper edge 22 of the air-bag. A gas generator 23 is connected to the neck 21 in generally the same manner as described with reference to FIGS. 1 to 3. A tether 24, which corresponds with the tether 9 of the embodiments described above, extends from part of the air-bag 20, and passes through a clamping ring 25 (equivalent to the clamping ring described above) which secures the neck 21 to the gas generator 23. This embodiment of the invention will operate in the same manner as that descried with reference to FIGS. 1 to 3.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An air-bag for a motor vehicle in the form of an inflatable curtain comprising the inflatable curtain having a gas inlet neck to receive a gas from a gas generator, the air-bag having a tether extending from an exterior of the air-bag at a point of attachment adjacent to the gas inlet neck, part of the tether being at least initially secured to a mounting arrangement including a mounting ring surrounding the inlet neck and clamping the neck to part of the gas generator, the tether passing through the mounting ring so to be clamped in position, the tether being yieldable and configured to be withdrawn from the mounting ring such that, on deployment of the air-bag, the point may move away from the mounting arrangement so that the tether yields and is withdrawn from the mounting ring with the absorption of energy.

2. An air-bag according to claim 1 wherein the tether is provided with an area of mechanical weakness.

3. An air-bag according to claim 2 wherein the area of mechanical weakness is provided by a notch or slit cut in the tether.

4. An air-bag according to claim 1 wherein the tether is provided with a terminal aperture for a connector to connect the end of the tether to a mounting bracket attached to the motor vehicle.

5. An air-bag according to claim 4 wherein the mounting bracket mounts the gas generator.

6. An air-bag according to claim 4 wherein the connector is a yieldable connector.

7. An air-bag according to claim 1 wherein the tether is formed integrally with the air-bag.

8. An air-bag according to claim 1 wherein the tether is stitched, glued or otherwise secured to the air-bag.

9. An air-bag according to claim 8 wherein the stitching, gluing or other securing of the tether to the air-bag is yieldable and yields, with the absorption of energy, on deployment of the air-bag.

10. An air-bag according to claim 1 wherein the neck is provided at one end of the air-bag.

11. An air-bag according to claim 1 wherein the neck is provided on the upper edge of the air-bag intermediate ends of an upper edge of the air-bag.

12. An air-bag for a motor vehicle in the form of an inflatable curtain comprising: a gas inlet neck extending from the inflatable curtain of the air-bag, the gas inlet neck being configured to receive a gas from a gas generator, a tether extending from an exterior of the air-bag at a point of attachment adjacent to the gas inlet neck, wherein part of the tether is at least initially secured to a mounting ring surrounding the inlet neck to clamp the neck to part of the gas generator, the tether passing through the mounting ring to clamp the tether in position, the tether being yieldable and configured to be withdrawn from the mounting ring such that, on deployment of the air-bag, the point may move away from the mounting ring so that the tether yields and withdraws from the mounting ring in order to absorb energy.

13. An air-bag for a motor vehicle in the form of an inflatable curtain comprising: a gas inlet neck extending from the inflatable curtain of the air-bag, the gas inlet neck being configured to receive a gas from a gas generator, a tether is stitched, glued or otherwise secured to an exterior of the air-bag at a point of attachment adjacent to the gas inlet neck, part of the tether is at least initially secured to a mounting arrangement, wherein the tether and the stitching, gluing or other securing of the tether to the air-bag are yieldable such that, on deployment of the air-bag, the point may move away from the mounting arrangement so that both the tether and the stitching, gluing or other securing of the tether to the air-bag yields in order to absorb energy.

14. An air-bag for a motor vehicle in the form of an inflatable curtain comprising the inflatable curtain having a gas inlet neck to receive a gas from a gas generator, the air-bag having a tether extending from an exterior of the air-bag at a point of attachment adjacent to the gas inlet neck, part of the tether being at least initially secured to a mounting arrangement, the tether being yieldable, and the tether being stitched, glued or otherwise secured to the air-bag such that the stitching, gluing or other securing of the tether to the air-bag is also yieldable, such that on deployment of the air-bag the point may move away from the mounting arrangement so that the tether and tether stitching, glue or other securing yields to absorb energy.

15. An air-bag according to claim 14 wherein the tether is provided with an area of mechanical weakness.

16. An air-bag according to claim 15 wherein the area of mechanical weakness is provided by a notch or slit cut in the tether.

17. An air-bag according to claim 14 wherein the tether is provided with a terminal aperture for a connector to connect the end of the tether to a mounting bracket attached to the motor vehicle.

18. An air-bag according to claim 17 wherein the mounting bracket mounts the gas generator.

19. An air-bag according to claim 17 wherein the connector is a yieldable connector.

20. An air-bag according to claim 14 wherein the tether is formed integrally with the air-bag.

21. An air-bag according to claim 14 wherein the neck is provided at one end of the air-bag.

22. An air-bag according to claim 14 wherein the neck is provided on the upper edge of the air-bag intermediate ends of an upper edge of the air-bag.

* * * * *